XR 3,735,374

United State X 3046C

Rembault

[11] 3,735,374

[45] May 22, 1973

[54] HOLOGRAM IDENTIFICATION SYSTEM

[75] Inventor: Michel Rembault, Paris, France

[73] Assignee: Thomson CSF, Paris, France

[22] Filed: June 25, 1970

[21] Appl. No.: 49,612

[30] Foreign Application Priority Data

July 9, 1969 France ................................ 6923274

[52] U.S. Cl......340/213 R, 340/146.3 P, 340/149 A, 350/3.5, 356/71

[51] Int. Cl. ............................................ G08b 21/00

[58] Field of Search.................... 340/149 A, 146.3 P, 340/213; 356/71; 350/3.5

[56] References Cited

UNITED STATES PATENTS

| | | | |
|---|---|---|---|
| 3,519,322 | 7/1970 | Brooks | 350/3.5 |
| 3,542,448 | 11/1970 | Reynolds | 350/3.5 |
| 3,553,460 | 1/1971 | Preston | 350/3.5 |
| 3,600,054 | 8/1971 | Gabor | 350/3.5 |
| 3,643,216 | 2/1972 | Greenaway | 356/71 |
| 2,931,916 | 4/1960 | Sinn | 340/149 A |
| 3,532,426 | 10/1970 | Lemmond | 340/146.3 P |
| 3,064,519 | 11/1962 | Shelton | 356/71 |
| 3,543,237 | 11/1970 | Cutler | 350/3.5 |
| 3,599,147 | 8/1971 | Rogers | 356/71 |

*Primary Examiner*—Thomas B. Habecker
*Attorney*—Cushman, Darby & Cushman

[57] ABSTRACT

An identification arrangement comprises light sources and photo-detectors arranged in accordance with a predetermined correspondence code. An appropriate key hologram produces, in respect of each of these sources, respective real images on the above photo-detector. Threshold circuits are connected to these photo-detectors and an assembly of coincidence circuits produces a signal when signals of predetermined levels are simultaneously applied to the outputs of all the photo-detectors.

9 Claims, 6 Drawing Figures

3735374
OR IN 340/213R

HOLOGRAM IDENTIFICATION SYSTEM

The present invention relates to a system of identification by hologram.

The invention is based upon the facility offered by a three-dimensional hologram, that is to say one whose thickness is large compared with the wavelength of the light used, for producing one or more real images of a luminous point of determinate positions.

Thus, there can be arranged to correspond with several luminous points with predetermined respective spatial positions with respect to a hologram, a certain number of real images of each of said points and the hologram accordingly enables the storage of a correspondence code.

The hologram of this kind will be referred to hereinafter as a "key hologram."

It is an object of the invention to utilize this possibility in order to create an identification system.

According to the invention, there is provided a hologram identification system, for identifying objects carrying at least one predetermined key hologram characteristic of a correspondence code between at least one point reference source and at least one luminous object point used for the formation of said hologram, comprising : *m* point light sources and *n* photo-detectors located in respective predetermined locations, *m* and *n* being positive integers, said locations being determined by said correspondence code; means for inserting said key hologram in a location predetermined with respect to said sources and said photo-detectors; logic circuit means connected to said photo-detectors and having an output for supplying a first control signal when, upon insertion of said key hologram, said *n* photo-detectors simultaneously supply respective signals; and supply means for supplying said sources and said logic circuit means.

For a better understanding of the invention and to show how the same may be carried into effect, reference will be made to the drawings accompanying the ensuing description and in which.

Figure 1:
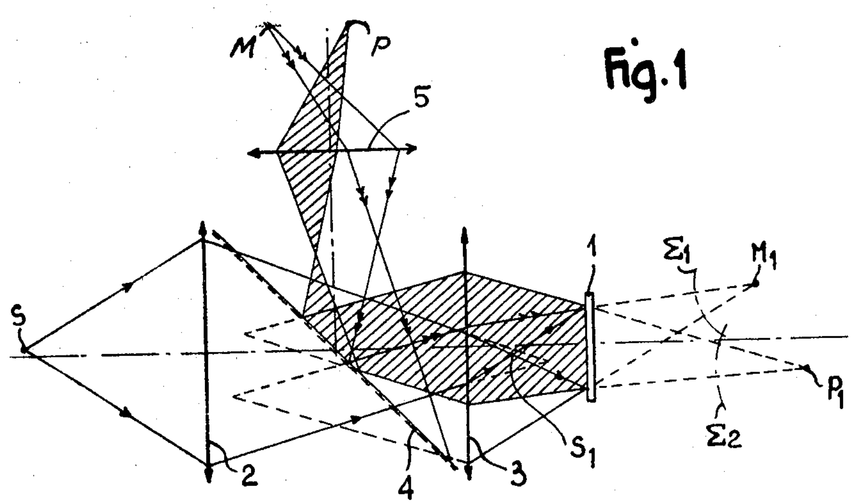
FIG. 1 illustrates a diagram of a device for producing a key hologram.

In FIG. 1, a highly schematic illustration of a device for producing a simplified key hologram 1 , is illustrated. For this purpose, a pattern of interference fringes is formed on the plate 1 . This pattern results from the interference between the light beam coming from a real monochromatic point source $S_1$, which is the image of a source S as produced by a lens system 2, 3 through a semitransparent mirror 4 , and virtual light points $M_1$ and $P_1$ which are the respective images of two light sources M and P , synchronous with S and produced by the optical system comprising the lenses 5 and 3 and the mirror 4 .

Once the hologram is created, if it is illuminated by a point monochromatic light source located precisely at $S_1$ , only two light waves $\Sigma_1$ and $\Sigma_2$ will be diffracted and the hologram will thus produce two luminous points located precisely at $M_1$ and $P_1$ which can be considered as the real images of the source S across the hologram 1 . On the other hand, the "efficiency" of the hologram is constant, that is to say that the luminous intensities received at points $M_1$ and $P_1$ are in a constant ratio with the luminous intensity supplied by the source $S_1$ .

Of course, at the time of the recording of the hologram, the operation can be repeated several times prior to development, using real light sources located in different positions in a space which will be called the "object space" (the space to the left of the hologram 1 in the case of FIG. 1), and virtual luminous points which are located in different positions in a space which will be referred to hereinafter as the "image space" (to the right of the hologram 1). The virtual light points can be provided in any number.

In this way, a key hologram is obtained which ensures an unequivocal correspondence between the light sources and their real images, thus defining a code of correspondence.

Figure 2:
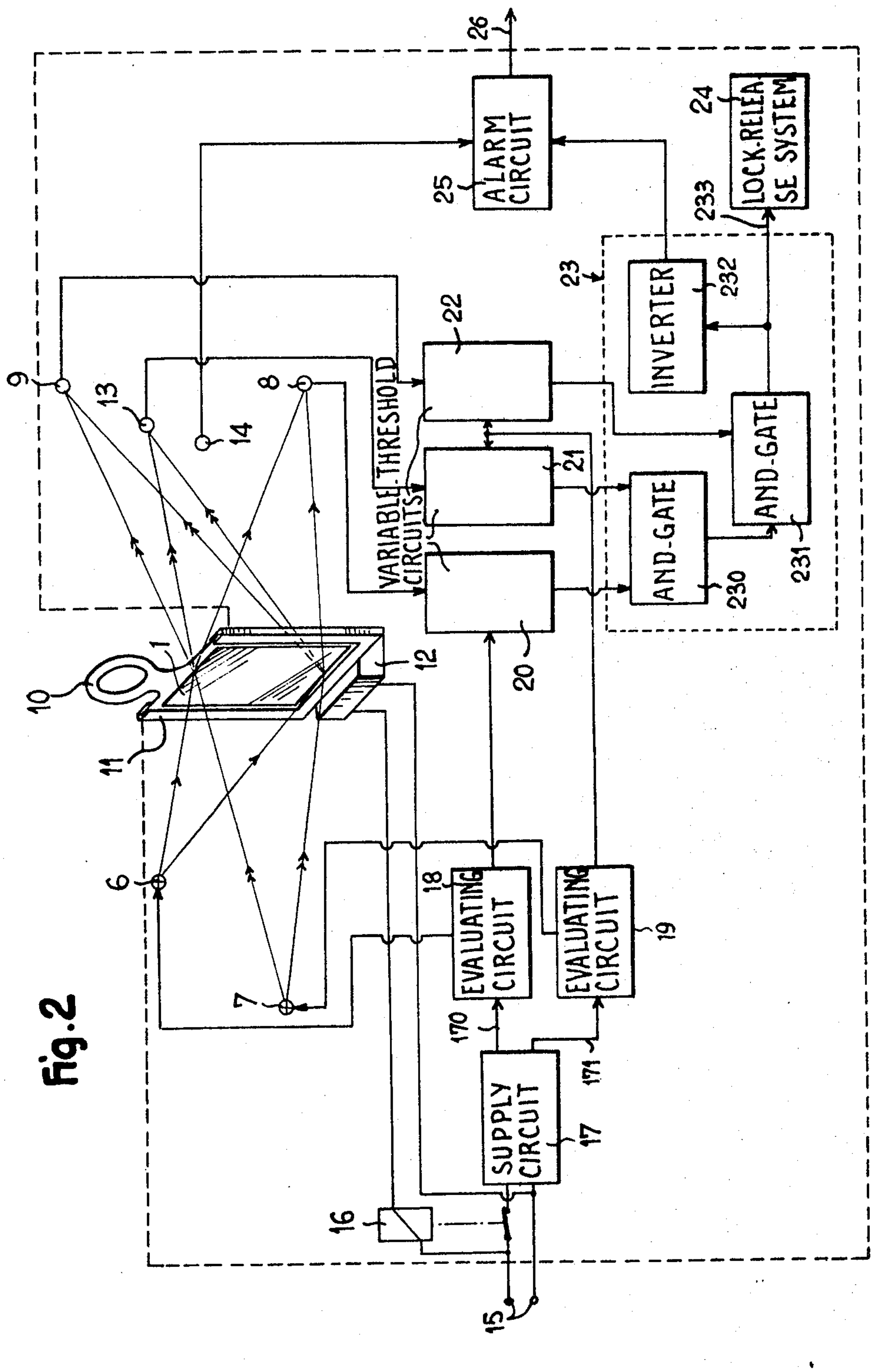
FIG. 2 is a diagram of the application of the identification system in accordance with the invention to a lock.

FIG. 2 illustrates the diagram of a lock with a holographic key, which is an application of the identification system in accordance with the invention. This lock has a key 10 and a key seat 11 . At one side of the plane of this seat there are arranged two light sources 6 and 7 and at the other side three photo-detectors 8, 9 and 13. The position of these sources and photo-detectors is defined with respect to the seat 11 in accordance with a predetermined code which means that to the source 6 there corresponds an image point at 8 and to the source 7 image points at 9 and 13. The light sources 6 and 7 are supplied through terminals 15 (connected for example to the mains) by a supply circuit 17 whose outputs 170 and 171 respectively feed the sources 6 and 7 through the medium of respective circuits 18 and 19 for evaluating the supplied current or power, this depending upon the type of source used as will be explained in detail hereinafter. The circuit 17 also ensures the electrical supply to other parts of the lock (connections not shown). A contact-breaker controls a switch 16 which supplies the circuit 17, when a key 10 carrying a key hologram 1 , is introduced into the key seat 11.

The identification of the key introduced in effected by three variable-threshold circuits 20, 21 and 22 respectively connected to the photo-detectors 8, 13 and 9 and whose outputs supply a logic circuit 23 whose output 233 can supply a control signal to the electromechanical lock-release system 24 . The threshold level of the circuits 20, 21 and 22 is controlled respectively by signals coming from the circuits 18 and 19 . The logic circuit 23 comprises a first AND-circuit 230 connected to the threshold circuits 20 and 21 , and a second AND-circuit 231, connected to the output of the first AND-circuit 230 and to the threshold circuit 22 , and whose output is connected to the output 233 . It is provided furthermore with an inverter circuit 232 connected to the output 233 , its own output being connected to an alarm circuit 25 which can produce an alarm signal at the output 26. The circuit 25 also receives signals from a photo-detectors 14.

The operation of this system is as follows, considering FIG. 3 also :

When a holographic key 10 is inserted into the key seat 11, the contact-breaker 12 triggers the supply to the system, and in particular to the light sources 6 and 7 .

If the key hologram 1 is the right one, that is to say if it corresponds with the correspondence code of the lock in question, it will produce a real image of the light source 6 on the photo-detector 8. The later will then supply a signal of an amplitude higher than the preset threshold of the circuit 20 , the level of which is preset to a value which takes account of the normal light intensity of the source 6 , and of the known efficiency of the key hologram, and varies an a function of the real luminous intensity supplied by the source 6 under the effect of the signals produced by the circuit 18 . A signal will therefore be transmitted by the threshold circuit 20 to one of the inputs of the AND-circuit 230 . In the same way, the key hologram 1 will produce two real images of the source 7 on the photo-detectors 9 and 13. These latter will then supply respective signals whose amplitudes are higher than the thresholds of the circuits 21 and 22 , whose levels are preset to values which take into account the nominal luminous intensity of the source 7 and the efficiency of the key hologram in relation to these two respective images, and vary as a function of the intensity of the source 7 under the effect of the signals produced by the circuit 19 . Consequently, signals will be transmitted by the circuits 21 and 22 respectively to the inputs of the AND-circuits 230 and 231 . The AND-circuit 230 , since it simultaneously receives signals at both inputs, supplies a signal to the other input of the AND-circuit 231 which, in turn, simultaneously receiving signals at both inputs, supplies a signal to the system 24 , the latter comprising for example solenoid-operated bolts.

It is obvious that the luminous intensity of the sources 6 and 7 can vary with time, for example as a consequence of variations in the mains voltage at the terminals 15 or variations in the characteristics of the supply circuits. These variations in the luminous intensity of the sources 6 and 7 are translated into terms of proportional variations in the luminous intensities received respectively by the photo-detector 8 and the photo-detectors 9 and 13 . And the levels of the signals produced by these photo-detectors can drop to below the thresholds of the circuits 20 or 21 and 22 , which could inhibit the release of the lock even when the proper key is used.

Figure 5:
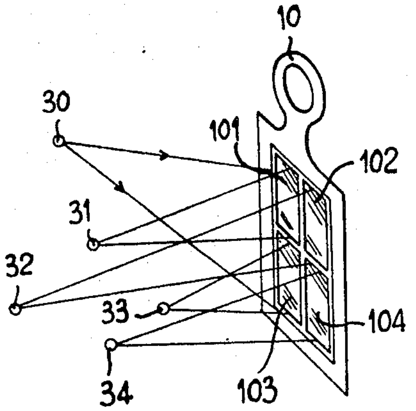
FIG. 5 is a partial illustration of a further variant embodiment of the identification system in accordance with the invention.

In order to overcome this drawback, a feedback line is used which makes it possible to vary the thresholds of the circuits 20, and 21 and 22 , as a function respectively of the luminous intensities produced by the sources 6 and 7 , For this purpose, the circuits 18 and 19 produce control signals, which cause the levels of the thresholds to vary around predetermined nominal values, for example as a function of the value of the supply current to the sources 6 and 7 if electro-luminescent diodes are involved (in which case the luminous intensity emitted is substantially proportional to the current through the diode), or as a function of the square of the value of said current if electric bulbs are being used (the case which will be considered in more detail in the description of FIG. 5). Self-evidently, other kinds of light sources could be used and it is quite easy to adapt the circuits 18 and 19 accordingly. On the other hand, it is equally possible to produce threshold control signal by directly measuring the luminous intensities of the sources 6 and 7 , for example using photo-detectors.

Figure 3:
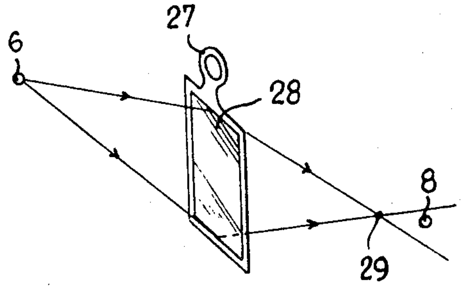
FIG. 3 is an explanatory diagram.

If now the case is considered in which, a key 27 , carrying a key hologram 28 which is not the correct one, is being used, then in the best case it could be expected that this key hologram would, for example in respect of a source 6 , produce a real image 29 in the correct direction, that is to say in the direction of the photo-detector 8 , but not exactly on said photo-detector (FIG. 3). Under these circumstances, it is obvious that the photo-detector 8 will receive only a part of the light energy of the beam converging at 29 , and that it will therefore produce a low signal, whose amplitude is below the threshold of the circuit 20 . Consequently, there will be no control signal at the output 233 and therefore the lock will not be released. Consequently, because of the threshold circuits, it is only the proper key hologram which is able to release the lock.

It may be useful for reasons of security, to have the possibility of detecting any attempt made to open the lock with a wrong key. This is the function of the circuits 232 and 25 . The circuit 232 is a signal inverter and is well known per se. It is supplied with energy, once a key inserted in the key seat 11 has operated the contact-breaker 12 , and it supplies a signal to the circuit 25 if it receives no signal from the circuit 231 , the reverse being also true. Thus, if the circuit 232 supplies a signal to the circuit 25 , this proves that a key, which is not the correct one, has been used in an attempt to release the lock, the circuit 25 then produces an alarm signal at the output 26 , which signal can be employed to trigger any suitable alarm device or can be transmitted to a central supervisory panel.

It may also occur that, in an effort to pick the lock somebody not only triggers the contact-breaker 12 but also brightly illuminates all the image space at the right-hand side of the lock 11 in order to saturate the threshold circuits 20, 21 and 22 . To cover this eventuality, an extra photo-detector 14 is located in the image space. It is connected directly to the circuit 25, without passing through a threshold circuit. In the case of any attempt to pick the lock, the photo-detector 14 , when illuminated, will supply a signal to the circuit 25 , thus triggering the alarm.

Moreover, the photo-detector 14 can also trigger the circuit 25 , if an incorrect key is used, under the effect of the diffused light which it receives in this case through the hologram, so that it duplicates the alarm circuit utilizing the circuit 232.

The system described, while it is compatible with the use of reproducible keys allows for an impressive number of code combination, since $10^{10}$ independent image points are quite easily realized. This number is large to the point of rendering it virtually impossible to discover the point combination of any particular lock without knowing it in advance. Also, due to the particular properties of holograms, even if the key is broken, its particular code correspondence can be retrieved, as long as a small fragment of the key hologram remains.

Figure 4:
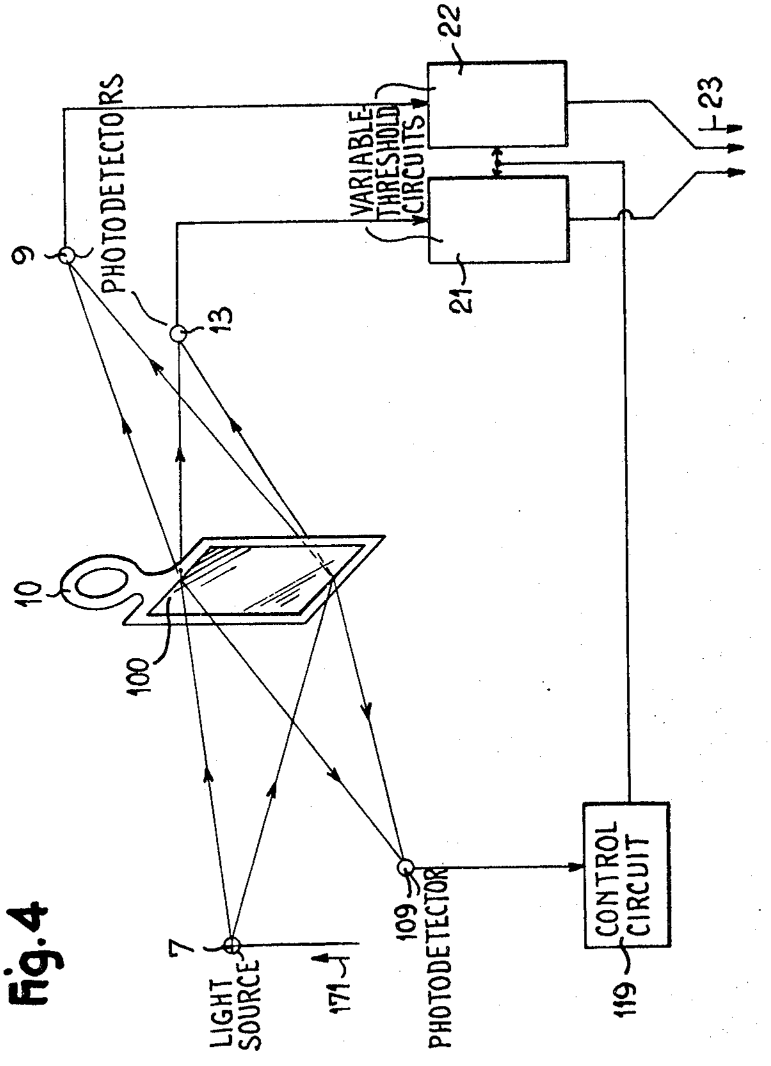
FIG. 4 is a partial illustration of a variant embodiment of the identification system in accordance with the invention.

Under certain conditions, it is even possible to release the lock with a remaining fragment of the hologram. For this, it is necessary that the residual fragment or fragments should positioned in the key seat at the locations which they occupied before the key was broken. Also, it is necessary for the lock to be designed in accordance with the variant embodiment shown in FIG. 4.

In this Figure, similar reference numerals designate the similar elements as in FIG. 2 , and all the elements not essential to an explanation of this aspect of the invention have been omitted.

In this embodiment, the variable thresholds of the circuits connected to the photo-detectors are controlled, in respect of each source, by a additional photo-detector. For example, in the case of the source 7 , which is the only one to be considered here, the key hologram 100 produces an additional real image of the source 7 , which image is formed on the photo-detector 109. The signal furnished by the detector 109 controls a circuit 119 which generates signals which control the variable thresholds of the circuits 21 and 22 , which are thus regulated as a function of the luminous intensity of the source 7 .

If the key hologram 100 has been broken and if there remains only one or a few pieces of it left in position in the key 10 , it is merely necessary to close off the openings left in the key by the missing parts in order to prevent triggering of the alarm. The detector 109 will take into account the fact that the amount of light transmitted is lower than if the hologram had been whole, and will accordingly lower the thresholds of the circuits 21 and 22 thus enabling the lock to be opened.

In FIG. 5 , there is shown a portion of a variant embodiment of the identification system in accordance with the invention. In the system of FIG. 2 , a key hologram operating by transmission has been employed. However, the same system is applicable to key holograms operating by reflection, these then producing real images which are situated at the same side as the light sources, in relation to the plane of the hologram.

However, it should be borne in mind that, in the case of three-dimensional reflective holograms, as those skilled in the art will appreciate, there is produced within the thickness of the hologram a phenomenon similar to interference filtering, and the thickness of the sensitive layer of the hologram determines the wavelength of the image beam which will be produced by white light object source.

Thus, if the key hologram is illuminated by s source which is no longer monochromatic but provides white light, this will produce a real image of the source not in white light but in light at the wavelength for which it has been designed.

It will be seen that this property can be exploited to complicate further the lock combination. In FIG. 5 , the key 10 has four key holograms 101, 102, 103 and 104 operating by reflection, each corresponding to a given wavelength. These key holograms produce in respect of the white light source 30 (for example an ordinary electric bulb), respective real images on the photo-detectors 31, 32, 33 and 34 at the respective wavelengths $\lambda_1$ , $\lambda_2$ $\lambda_3$ , and $\lambda_4$ . If, for example, a photodetector 31 which is sensitive to the wavelength $\lambda_1$ (for example in the blue part of the spectrum), but insensitive to others, is used, then it is possible to prevent the opening of the lock by a false key which, whilst ensuring positional accuracy of the source and images, does not give the corresponding wavelengths.

The use of an electric bulb in combination with a transmission-type key hologram (no filtering effect by the hologram) requires the introduction of a filter after the source or before the detectors, in order to filter out the effective luminous radiation.

Figure 6:
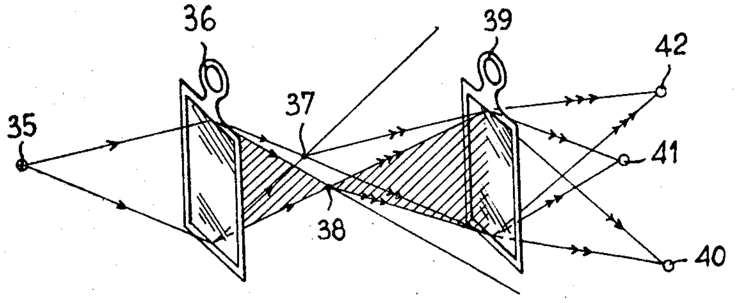
FIG. 6 is a partial illustration of still another variant embodiment.

FIG. 6 illustrates a variant embodiment in which two keys are employed in series for releasing a lock. The first key 36 produces two real images 37 and 38 of the source 35, which act as light sources with respect to the key 39 , the latter producing in turn images of these on the photo-detectors 40 and 41 , and upon the photodetector 42.

Of course, other combinations can be conceived without departing from the spirit and scope of the invention.

The system considered does not allow the use of a pass-key which is possible with conventional locks. However, it is nevertheless possible to conceive of a system of *n* locks which can all be opened by the same general key and each one separately by an individual key as well. For this purpose, it suffices that the pass key should carry the *n* key holograms corresponding to the *n* locks side-by-side in a predetermined order and to position in each individual key, the corresponding key hologram in the position so determined.

Of course, the embodiments described are in no way limitative of the scope of the invention and have been given solely by way of example. In particular, the system of identification in accordance with the invention has been described as applied to a lock. It goes without saying, however, that it can also be used for purposes of identification of any objects which are marked by the key hologram and of sorting them.

What is claimed, is :

1. A hologram identification system, for identifying objects carrying at least one hologram key means storing a pattern of interference fringes constructed from light beams respectively emitted by *m* point reference sources and focused on *n* luminous object points; the locations of said point sources and said object points in relation to said hologram key means being characteristic of a predetermined correspondence code ; said identification system comprising: *m* point light sources and *n* point photo-detectors located in respective predetermined locations determined by said correspondence code, *m* and *n* being positive integers higher than one; means for positioning said hologram key means in a location where said hologram key means actually focuses said sources onto said photo-detectors ; logic circuit means connected to said photo-detectors and having an output for supplying a first control signal when, upon insertion of said hologram key means in said location, said n photo-detectors simultaneously supply respective signals ; and supply mans for supplying electrical energy to said sources and said logic circuit means.

2. A system as claimed in claim 1 , wherein said logic circuit means comprise threshold circuits for said control signal to be supplied if said photo-detector signals have respective amplitudes simultaneously higher than respective predetermined thresholds.

3. A system as claimed in claim 2 , wherein said logic circuit means comprise : *n* variable threshold circuits connected respectively to said photo-detectors and having each a threshold level control input; *m* evaluating circuits, coupled respectively to said light sources and having outputs respectively connected to said control inputs of said threshold circuits which are connected to said photo-detectors corresponding respectively to said sources, for evaluating the light intensities respectively supplied by said sources and for supplying threshold control signals; and coincidence circuit means having n inputs respectively connected to said threshold circuits and an output for supplying said first control signal.

4. A system as claimed in claim 3 , wherein said inserting means comprise means for inserting a plurality of key holograms in series, at least the first of which operates by transmission, the real point images supplied by one of said holograms serving as point light sources for the next one of said holograms.

5. A system as claimed in claim 3 , wherein said key hologram is an hologram operating by reflection, said sources are white light sources and said photodetectors are selected for being sensitive to the wavelengths of the light radiations reflected by said hologram.

6. A system as claimed in claim 3 , wherein said evaluating circuits comprise each an auxiliary photodetector and said key hologram forms an extra real image of the corresponding light source on a predetermined location where said auxiliary photo-detector is located.

7. A system as claimed in claim 1 , wherein said logic circuit means further comprise an alarm arrangement for signalling that the illumination of said photodetectors is different from the illumination according to said code.

8. A system as claimed in claim 7 , wherein said arrangement comprises an alarm circuit and an extra photo-detector connected to said alarm circuit.

9. A system as claimed in claim 8 , wherein said arrangement further comprises an inverter, connected to said output of said logic circuit means and having an output connected to said alarm circuit.

* * * * *